United States Patent

Taudt et al.

[11] 4,206,475
[45] Jun. 3, 1980

[54] APPARATUS AND A METHOD FOR OBTAINING DIGITAL DATA FOR RASTERS HAVING A PLURALITY OF COLOR COMPONENTS

[75] Inventors: Heinz Taudt, Kiel; Armin Colditz, Kiel-Wellsee, both of Fed. Rep. of Germany

[73] Assignee: Dr.-Ing. Rudolf Hell GmbH, Kiel, Fed. Rep. of Germany

[21] Appl. No.: 842,286

[22] Filed: Oct. 14, 1977

[30] Foreign Application Priority Data

Oct. 18, 1976 [DE] Fed. Rep. of Germany ....... 2646925

[51] Int. Cl.² ................................................ H04N 1/46
[52] U.S. Cl. .......................................... 358/78; 358/75
[58] Field of Search ............................... 358/78, 75, 13

[56] References Cited

U.S. PATENT DOCUMENTS

| | | | |
|---|---|---|---|
| 3,604,838 | 9/1971 | Hurley et al. | 358/78 |
| 3,767,844 | 10/1973 | Schnattinagr et al. | 358/78 |
| 3,819,854 | 6/1974 | Kolb | 358/78 |

Primary Examiner—Richard Murray
Attorney, Agent, or Firm—Ernest F. Marmorek

[57] ABSTRACT

A process of obtaining digital data for color components of a color image includes the steps of quantizing color-processor derived signals to obtain first and second raster signal scans, wherein each of the raster signal scans has a multiplicity of raster spots spaced apart from one another at first and second predetermined distances. The first and second distances of the first raster signal scan correspond substantially to the second and first distances of the second raster signal scan, respectively. Only the raster signal scans corresponding to the color-processor obtained signals in the first and second memory segments, respectively, are stored.

9 Claims, 12 Drawing Figures

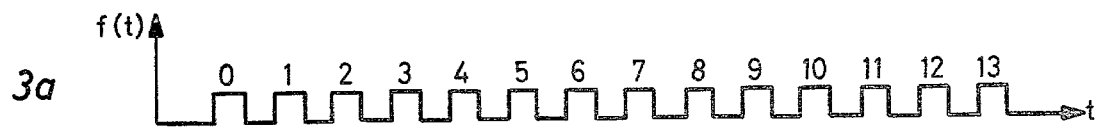
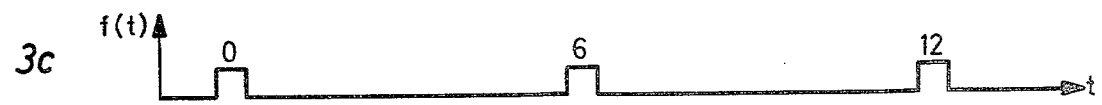
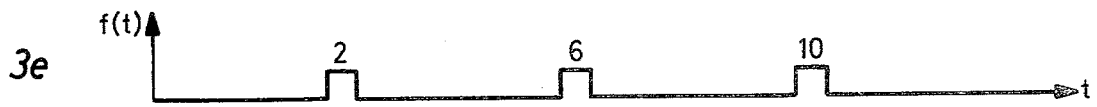
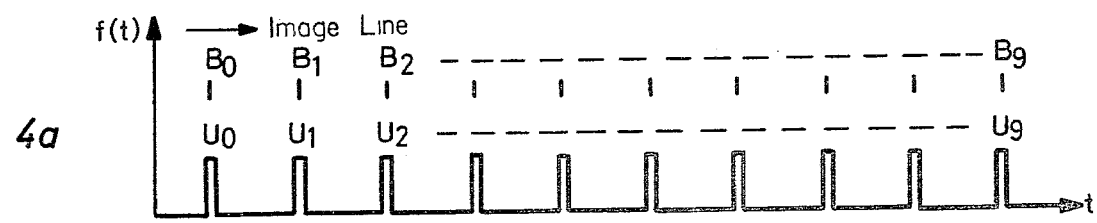
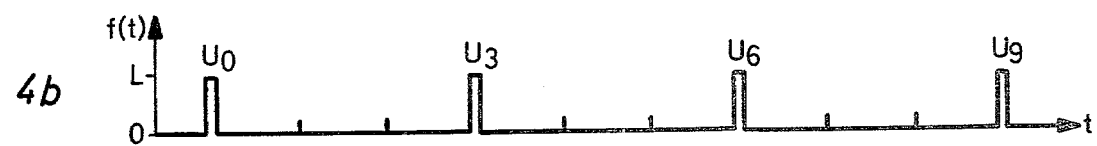
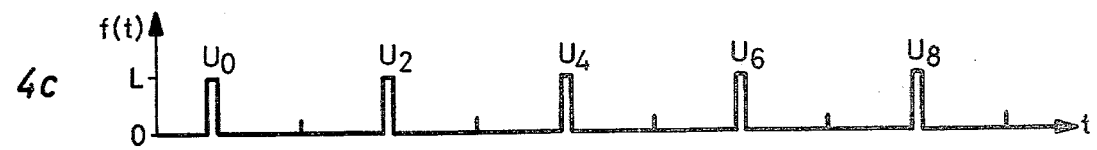
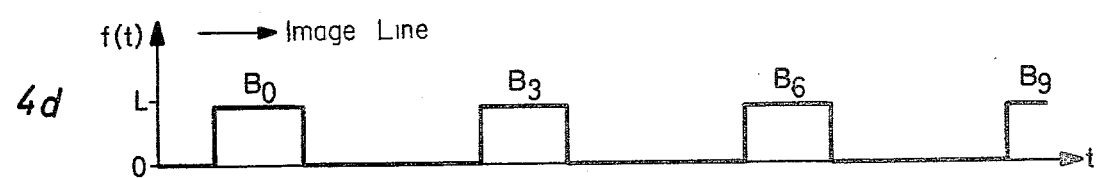
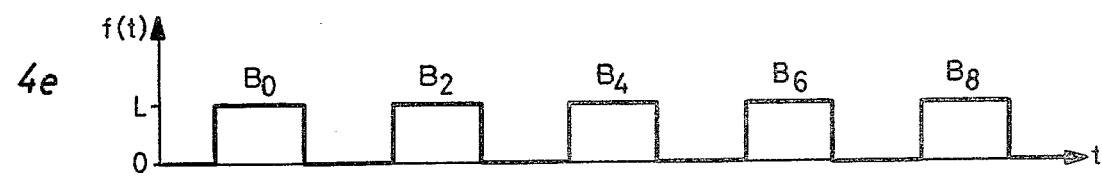

APPARATUS AND A METHOD FOR OBTAINING DIGITAL DATA FOR RASTERS HAVING A PLURALITY OF COLOR COMPONENTS

BACKGROUND OF THE INVENTION

1. Field of the Invention

The invention relates to the obtaining of digital recording data for rastered color separations in the field of printing techniques.

2. Description of the Prior Art

In the field of printing techniques, it is known to prepare color separations in a rastered manner for the purpose of multi-color-printing, whereby the raster can differ from color separation to color separation. In the case of the four-color-printing process, for example, the rastered color separations can be obtained from the scanning signals, with separate digital intermediary storage of the individual raster-spot-configurations and with a relatively complex recording unit, such as it is described in the British Pat. No. 1,355,540. In the case of this process, the color separations are individually recorded one after the other, whereby a separate scanning process is required for each color separation.

However, in modern printing techniques, which more than before make use of digital image processing, for example British Pat. No. 1,407,487 or British Pat. No. 1,404,672, it is desirable to obtain the color separations as quickly as possible, in order to retrieve them from digital memories for further processing such as, for example, for the computer controlled preparation of printed pages, for engraving processes or for electronic photo-compositions. The data of the color separations are present in the memory unit in digital form and, according to the distance of the scanning points on a scanning line and the distance of the scanning lines from one another, furnish an orthogonal network of scanning points. This network is the same for all color separations and therefore completely unsuitable for the multi-color printing-process. If all the color separations were to be prepared with this raster then, on superimposing the color prints, an image with an intolerable interplay of colors would result since alignment- and recording-errors are unavoidable due to the distortion of the paper and the mechanical tolerances in the printing plants. The interplay of colors takes place for the following reason namely, since based on these errors, the color-points are printed once on top of one another and once next to one another.

From the German Patent Application Open to Inspection No. 23 11 678, we already known of a device for preparing color separations of a multicolored image, in the case of which the color separation signals, obtained through optical-electrical scanning of an original image, are digitally fed in parallel into a memory unit, in order to be read sequentially after having been recorded in the memory unit and in order to be then sequentially recorded on the periphery of a recording drum. Similar processes are disclosed in the U.S. Pat. No. 3,878,559 and in the British Pat. No. 1,382,124. The disadvantage of these processes consists therein in that the recorded color separations are not in raster form, since a D/A-transducer is switched into circuit beyond the memory-unit. In the known process, the scanning raster is therefore again eliminated and the color separations are recorded in analog manner, that is to say not in a raster form. As far as the printing process is concerned, a separate process follows thereupon, namely in that from the color separations which are not present in raster form, rastered color separations are obtained through a re-copying process by means of side-by-side rotated contact rasters.

Furthermore, according to the German Pat. No. 1,112,407, a raster process is known which is used particularly in integlio-printing processes in which two color separations each (magenta and yellow or cyan [-blue] and black or two others in each case) are prepared with two similar rasters. These rasters are characterized in that the one raster to be used for the two first mentioned color separations can be expanded in horizontal direction, that is to say in transversal direction to the lines and is held taut in vertical direction, that is to say in longitudinal direction of the lines, whereby the raster distance in longitudinal and transverse direction show in each case the behaviour of whole numbers. In conforming manner, the raster for the two other color separations is obtained in a similar manner, namely in that the raster is expanded here in the opposite sense, that is to say in the longitudinal direction of the lines and in that the raster is held taut in the same manner as before. In a practical case of application, for exemple, in the case of the "Helio-Klischograph" engraving machine of the applicant, the recording of the raster spots take place thereby in that an engraving needle oscillates with a fundamental frequency which furnishes a desired time derived and therefore localized distance of the raster spots, whereby the continuously furnished image signal is superimposed over the fundamental oscillation. This process is carried out once for each color separation, that is to say all together four times.

This has the disadvantage that the obtaining of the complete four color-separation-signals is possible only in form of the printed form and that this is time-consuming owing to the fact that scanning operations are repeatedly required.

SUMMARY OF THE INVENTION

The present invention relates to an arrangement and to a method for obtaining digital recording data for rastered image reproduction by means of an evaluation of an image signal furnished continuously by a scanning device, with the evaluation taking place at the raster timing frequency of a printing raster, whereby the raster spot distances in longitudinal and transverse direction of the lines behave as whole numbers with respect to one another.

It is the object of the invention to disclose a method and an arrangement, in the case of which the recording data of the color separations are obtained in a simple manner directly during the scanning process, with the color separations being obtained in the final printing rasters. One of the characteristics of the invention consists therein, namely in that for the purpose of obtaining all color separations or simultaneous corresponding storage by means of a single scanning process, a fundamental impulse generator is provided for, from which impulses are sorted out in such a manner, so that for each color separation, the sampling (fixed-cycle-controlled evaluation of the scanning signal) takes place at the correct raster distance and that the feeding motion takes place step-by-step in a transverse direction to the line, whereby however, in a manner characteristic for each color separation, the signal evaluation takes place only in the feed-positions, which correspond to the raster distance in a transverse direction to that of the lines.

It is the further object of the invention that the color separation signals of the color separations are obtained during the scanning process, whereby the distances of the scanning lines are equal to the distances of the projections, in perpendicular direction to the scanning line, of the individual raster spots of the different color separations, whereby the digitization of the individual color separation signals, obtained through color-splitting, takes place with fixed-cycle frequencies which, in each case, correspond to the distances of the raster spots of the individual rasters seen in direction of the scanning lines, so that the digitized color separation signals of the individual color separations follow as image signal and are stored in different storage areas of a memory unit, so that the storage of the signals of a color separation takes place only when a scanning line belonging to the color separation raster in question is scanned.

A further object of the invention lies therein, in that the distance between the individual scanning lines is the same and has an order of magnitude which results from a common divisor of the distances of the projections, in perpendicular direction to the scanning line, of the raster spots of the individual rasters of the different color separations.

A further object of the invention lies therein, in that in the case of scanning the image pattern on a rotating drum, the scanning lines are present in helix form.

A further object of the invention consists therein, in that the scanning lines of a scanning process carried out on a rotating drum, are formed by closed cylindrical peripheral lines resulting from the intermittent feed.

A further object of the invention consists therein, in that in the case of scanning the image pattern on a plane surface, the scanning lines are parallel straight lines.

A further object of the invention consists therein in that two rasters are used, of which the first one is elongated in scanning direction and the secobnd one is compressed in scanning direction and the first one is compressed in a perpendicular direction to the scanning direction and the second one is elongated in a perpendicular direction to the scanning direction.

A further object of the invention consists therein in that of four color separations in each case two are recorded in the first raster and two in the second raster.

Further objects of the invention, as well as the advantages of the same will become apparent from the following description, whereby an advantageous exemplified embodiment is described in connection with the attached drawings. Further modifications and variants of the invention are possible without deviating from the basic thoughts and the concept of the invention.

BRIEF DESCRIPTION OF THE DRAWINGS

In which

FIGS. 3a to e show pulse diagrams for the control of the image point selection of the different rasters, and FIGS. 4a to e shows pulse diagrams for the image line selection of the different rasters.

DESCRIPTION OF A PREFERRED EMBODIMENT

Figure 1:
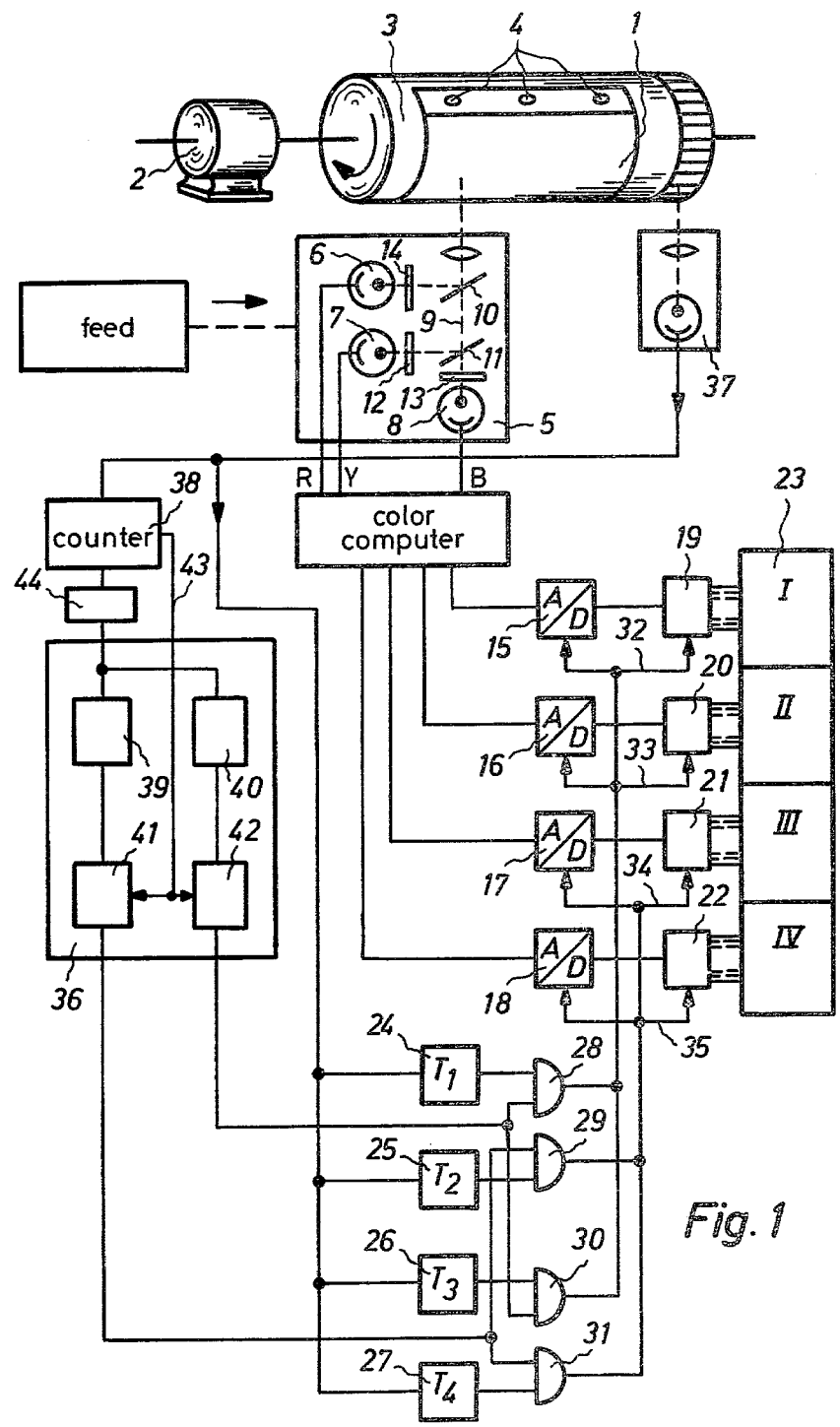
FIG. 1 shows a circuit diagram for the implementation of the invention.

In FIG. 1, an image pattern 1 is mounted in a stretched-out manner by means of register-pins 4 on a scanning drum 3 which is driven by a motor 2. The image pattern is opto-electrically scanned by a scanning unit 5 which is guided in axial direction along the drum by means of a schematically illustrated feed device. The feeding process can take place in a uniform manner leading to a helical scanning of the image pattern, or can take place by means of a stepwise feed-process after each rotation of the drum, which leads to a scanning of the image pattern in form of closed circles along the periphery of the drum.

Further scanning devices, which are not illustrated here but are known, are the so-called "Flying-Spot"- —and flat-bed—scanning-devices, which can likewise be used here. What is common to these two scanning methods is the fact that the image pattern is scanned along adjacent lying scanning lines.

As is known, the scanning head 5 contains three opto-electrical transducers 6, 7 and 8 which, via mirrors 10, 11 and filters 12, 13 and 14, receive the spectral components corresponding to the color separations from the partial rays of the scanning-light-ray 9. At the output of the scanning head 5, the color-measurement-value-signals R, Y, B appear which, through the intervention of a color computer, for example, in the manner disclosed in U.S. Pat. No. 3,885,244, are subjected to a correction required for printing purposes, and are then fed via the A/D-transducers 15 to 18 and input registers 19, 20, 21, and 22, into the storage areas I, II, III and IV of a memory unit 23. The characteristic property of the present invention does not consist therein that the signals, as in the known methods, are merely converted in an analog/digital manner and stored, but consists therein that the scanning- digitalization- and memorization— processes are carried out in such a manner so that the data of the finished raster color separations are digitally stored in the areas I to IV of the memory unit 23, as it will be explained below in further detail.

Figure 2:
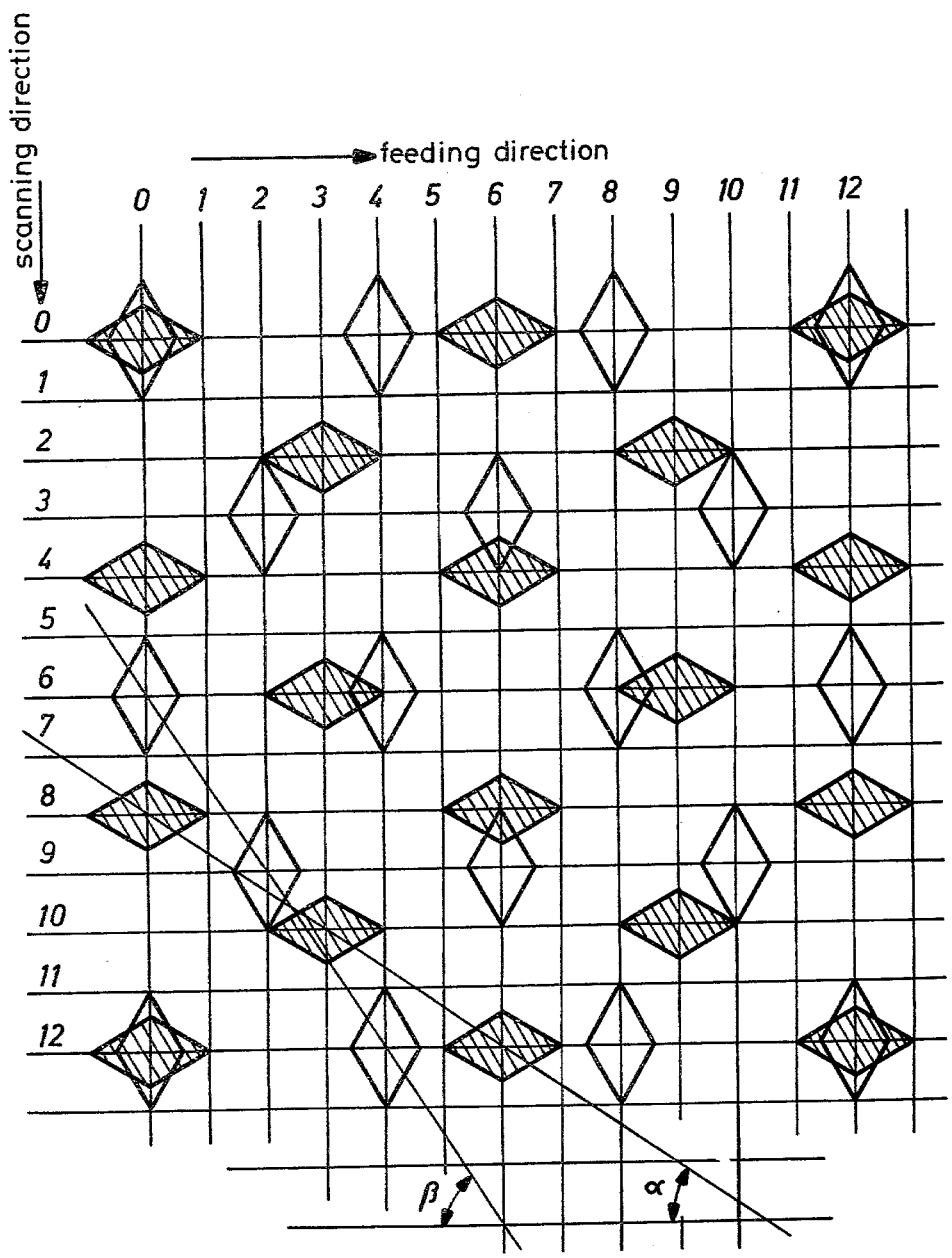
FIG. 2 shows an example of a raster used in the invention.

In FIG. 2, a raster system is illustrated which, for example, is used in intaglio printing processes and is disclosed in the German Pat. No. 1,112,407, and in the case of which one is dealing with two different rasters with the aid of which, however, one prints in four colors. To give an example, cyan [-blue] and black can be printed with one raster and yellow and magenta with the other raster. Such raster systems, in the case of which two colors are employed in each case which in combination do not produce a noticeable interplay of colors, have been used for some time for intaglio printing processes. For the sake of a good unerstanding of the present invention, we will start here with such a simple system. One deals here with two rasters, the first one of which is elongated in the direction of scanning and the second one of which is compressed in the direction of scanning and where the first raster is compressed in perpendicular direction to the direction of scanning and where the second raster is stretched in perpendicular direction to the direction of scanning, with this being done in such a manner so that the compression or elongation of the one raster along a coordinate correspond to the elongation or compression of the other raster along the other coordinate. As can be seen from FIG. 2, two rasters are formed thereby which, with respect to the scanning direction, are rotated by the angles α and β and of which one is shown in a cross-hatched manner and the other in a not cross-hatched manner. All raster spots of the two rasters lie, however, on lines parallel to the direction of scanning, as it results from a projection of the raster spots onto a line perpendicular to the direction of scanning. This is made use of by the present invention. The number and the degree of definition of the scanning lines, which are scanned by the scanning head 5, are selected in such a manner so that all parallel lines are scanned and thus all raster spots are scanned. This is accomplished by means of an appropriate control of the advancing movement of the scanning head 5, namely in a manner corresponding to the distances of the projections of the raster spots on the line at right angles to the scanning direction, that is to say the direction of advancement.

However, in order to be able to correctly pick-up and store all raster spots of a scanning line for the different rasters of the individual color separations, four timing generators 24, 25, 26 and 27 are provided in FIG. 1, which generate pulse sequences $T_1$ to $T_4$, which in turn are fed via the AND-gates 28, 29, 30 and 31, to the pulse-sequence leads 32, 33, 34 and 35 of the A/D-transducers 15 to 18 and to the input registers 19 to 22. The pulse-sequence generators are controlled by a pulse generator 37 which is assigned to the scanning drum and, synchronously with the rotation of the drum, picks up a pulse sequence. This fixed-cycle frequency is selected in such a manner so that it corresponds to the finest subdivision of the two rasters of FIG. 2 seen in scanning direction, that is to say, the length measured by a single pulse sequence along a peripheral line of the drum is equal to the length which results from the projection of the two rasters onto the scanning direction, as common divisor for the distamces of the raster spots of both rasters in the scanning direction. This fixed-cycle sequence, in the following referred to as socalled superimposed fixed-cycle sequence, is illustrated in FIG. 3a. In the case of a scanning drum with a circumference of 1 m and in the case of a 80-mesh raster, the frequency of this fixed-cycle sequence can amount to about ½ MHz, however, this frequency can be of a larger or smaller order of magnitude depending on the desired drum diameter and the required rate of speed with which the scanning data are needed. From this socalled superimposed fixed-cycle sequence, the pulse sequences required for the digitalization and the storage of the different color separation signals are derived, in that for example for the rasters shown in FIG. 2 in cross-hatched manner, only the pulse sequences 0, 4, 8, 12, etc. are used. For this purpose, the timing generator 24 is provided in FIG. 1, which converts the fixed-cycle sequence of FIG. 3a arriving from the pulse generator 37 into a fixed-cycle sequence of FIG. 3b, which controls the A/D-transducer 15 and the input register 19 or the storage area I, or activates the AND-gate 28 only at the points in time 0, 4, 8, 12, etc. The function of the AND-gate 28 will be explained later on in detail when the timing-control for the individual image lines of the cross-hatched and not cross-hatched rasters of FIG. 2 are discussed. However, it should be stated here that it will transmit only then when the image lines belonging to the corresponding raster lie below the scanning unit.

This fixed-cycle sequence illustrated in FIG. 3b is present in FIG. 1 at the A/D-transducer 15 and at the input-register 19 and effects the following, namely that for the first scanning line only the signals of the magenta color separation can be fed to the storage area I with this fixed-cycle sequence.

For the storage of the first image-line of the non cross-hatched raster of FIG. 2, for example, only the fixed-cycle sequence 0, 6, 12, 18 of the timing generator of the fixed-cycle sequence of FIG. 3a are used. This fixed-cycle sequence illustrated in FIG. 3c, controls in FIG. 1 the A/D-transducer 17 and the input-register 21 via the AND-gate 29, through which action the cyan [-blue] color separation is stored in the storage area III. The AND-gate 29, as well as the AND-gate 28 serve for the correct image-line selection, which process will be described later on in detail.

The generation of the pulse sequences in the generators 24, 26 and also 25, 27 can take place through counting of the pulses of the fixed-cycle sequences, delivered by the pulse generator 37, for which purpose the generators are designed as adjustable counter-units. A further possibility consists therein, in that oscillators are used, which furnish fixed-cycle sequences of the desired frequencies and are started and synchronized by the pulse generator 37. For this purpose it is advantageous to design the pulse generator 37 in such a manner, so that at each new scanning line it delivers an additional circumferential pulse, that is to say a starting pulse which, for example, is illustrated in FIG. 4a and can also be used for the image-line selection of the individual rasters. The circumferential pulses $U_0$, $U_1$, $U_2$, etc. are assigned to the image lines $B_0$, $B_1$, $B_2$, etc., which illustrate the image lines represented in FIG. 2 in feeding direction by 1, 2, 3, etc. Since in the case of the present exemplified embodiment two color separations are recorded with one raster, the timing generator 24, via the AND-gate 28, additionally controls the A/D-transducer 16 and the input register 20, as a result of which the signals for the yellow color separation are fed into the storage area II. Via the AND-gate 29, the generator 25 additionally controls the A/D-transducer 18 and the [input-] register 22 for the purpose of storing black color separation in the storage area IV.

However, since the raster spots which lie in the following scanning line, are displaced with respect to the preceding scanning line, a time-wise displaced control of the corresponding A/D-transducers and input registers is necessary for this scanning line. For this purpose, the timing generators 26 and 27 are provided for, which furnish fixed-cycle sequences which, with respect to the fixed-cycle sequences of the generators 24 and 25 are displaced by a time interval corresponding to one half of the raster distance in the scanning direction and being shown in FIGS. 3d and 3e. In the example of FIG. 1 adjustable counting units are to be again provided for, which derive, from the socalled superimposed fixed-cycle sequence furnished by the pulse generator 37, the pulse sequences which are correct for the selection of the color separation signals. However, one could also use the fixed-cycle sequences $T_1$ and $T_2$ of the generators 24 and 25 and delay them in an appropriate manner.

For the scanning line 2 (cross-hatched raster) of FIG. 2, the fixed-cycle sequence 3, 9, 15 according to FIG. 3d is to be provided for, and for the scanning line 3 (cross-hatched raster), the sequence 2, 6, 10 according to FIG. 3e is to be provided for. The generator 26, for example, is to furnish the fixed-cycle sequence T3, 2, 6, 10, etc., and the generator 27 is to furnish the fixed-cycle sequence T4, 3, 9, 15, etc. Since two color separations again have the same raster, the fixed-cycle sequence T3 of FIG. 3e is fed in each case to the A/D-transducers 15 and 16 connected to the registers 19 and 20, and the fixed-cycle sequence T4 of FIG. 3d is fed in each case to the A/D-transducers 17 and 18 connected to the registers 21 and 22.

So that the memorization of the digital data in storage areas I to IV takes place in conformity with the scanning lines in the feed direction, it is only in the case of the scanning lines, to which a raster-spot-line corresponds in the printing raster, that the scanning data of the raster spots of this raster can be memorized. At the outputs of the timing generators 24 to 27, the AND-gates 28 to 31 are provided for this purpose, which AND-gates are activated by the generators 24 to 27. The circuit is connected-through by means of a scanning-line-selection-circuit 36. In the example given in FIG. 1, the pulse-generator 37 furnishes a fixed-cycle sequence from which in each case a peripheral pulse is removed in a counter-unit 38, which peripheral pulse is used as line-starting-pulse and is illustrated in FIG. 4a. However, the pulse generator—as already mentioned before—could also furnish only such a starting-pulse, as a result of which the counter-unit 38 can be omitted. The line-starting-pulses $U_o$, $U_1$, $U_2$, etc. of FIG. 4a, which correspond to the image-lines $B_o$, $B_1$, $B_2$, etc., and are designated in FIG. 2 by the numbers 0, 1, 2 in the feeding direction, originate from the counter-unit 38 and from there pass to two adjustable counter-units 39 and 40, which undertake a scanning-line selection. The counter-unit 40, for example, only forms the peripheral pulses of the scanning lines of the cross-hatched rasters, that is to say $U_o$, $U_3$, $U_9$, etc., which free the gates 28 and 30 and are represented in FIG. 4b, and the counter-unit 39 forms the peripheral pulses of the scanning lines of the rasters which are not cross-hatched, namely the rasters $U_0$, $U_2$, $U_4$, $U_6$, etc. of FIG. 4c, which free the gates 29 and 31. The other pulses are suppressed in each case. So that when dealing with a peripheral pulse which had been allowed to pass through, the post-coupled AND-gate remains activated during the entire course of the scanning line, triggering-stages 41 and 42 are provided after the counter-units 39 and 40, which triggering-stages, when triggered by a peripheral pulse which had been allowed to pass through, signal the signal-value "L" for the duration of the scanning line, and in the case the starting pulse had not been allowed to pass through, signal the state "O" and therewith lock the corresponding AND-gate. The output signals of the triggering-stages 41 and 42 are illustrated in FIGS. 4d and 4e. FIG. 4d shows the pulses $B_0$, $B_3$, $B_6$, etc., which are derived from the pulses of FIG. 4b, FIG. 4e shows the pulses $B_0$, $B_2$, $B_4$, etc., which are derived from the pulses of FIG. 4c and serve for the memorization of the cross-hatched raster. The individual triggering-stage establishes a through-circuit at each peripheral pulse which had been allowed to pass through and is reset at each following peripheral pulse. For this purpose a reset-line 53 is provided, which is connected to the triggering-stages 41 and 42. So that the triggering-stages 41 and 42 can properly carry through their function, a fixed-cycle time-delay switch 44 is provided ahead of the counter-units 39 and 40, which—by the fraction of the duration of one fixed-cycle—delays the peripheral pulses which passes to the counter-units 39 and 40, with respect to the peripheral pulses used for the resetting of the triggering-stages 41 and 42. Such fixed-cycle time-delay switches are generally known and therefore are not illustrated here in detail.

In the example, the counter-unit 40 has the output pulse sequence 1, 0, 0, 1, 0, 0, 1, etc. for the compressed raster. Thus, the triggering-stage 42, a flip-flop, furnishes the signal "L" for the duration of the zero image line, the signal "O" for the duration of the first and second image line and the signal "L" for the duration of the third image line. As can be readily seen, the AND-gates 28 and 30 will only allow the scanning lines to pass, in which the cross-hatched raster spots lie (areas I and II), while the gates 29 and 31 will only allow the raster spots to pass which are not cross-hatched (areas III and IV). For the creation of the image-line selection, in place of the flip-flops also monostable triggering-stages can be used, which are triggered by the pulses counted out by the counter-units 39 and 40 and are connected-through for the duration of one line. Under those circumstances, the fixed-cycle time-delay switch 44 and the reset-line 43 are omitted, since the monostable triggering-stages are reset automatically after a time-period set according to the length of the line, that is to say they give-off the signal "O".

In the case of a helical scanning, the scanning-heated scans all scanning lines, for example, also the lines 1 and 5, on which no raster-spots lie. However, through the scanning-line selection-circuit, these scanning lines are suppressed with the aid of the AND-gates. The distance of the scanning lines is here a common divisor of the projection of the distances of the raster spots with respect to the feeding direction.

In the case of other scanning devices, for example those with a step-by-step advancement mechanism, such scanning lines can be bypassed.

The example of the raster of FIG. 2 shows a raster system, in which the elongation or the compression of the one raster correspond to the compression or elongation of the other raster when exchanging the scanning- and advancement-mechanism. However, raster-systems are equally possible in which these secondary conditions do not have to be fulfilled. They can equally be scanned along parallel scanning lines.

An advantage of this scanning in comparison to the hitherto used scanning systems consists therein, in that all rasters are scanned with a single lead of a spiral, whereby errors can be avoided which can occur when images are recorded with stepwse advancement within circular lines.

Furthermore, single pages may be individually processed here in an intaglio-printing process in a manner which is better than in the case of the conventional scanning machines, since up to now all image patterns had been mounted on the image-pattern-cylinder and had been subjected to a joint color correction.

The storage into the individual storage areas can also be accomplished directly in a large scale memory-unit used for the intaglio-printing process, in which memory-unit the layout required for the final intaglio-printing process is already taken into consideration.

In the case of the utilized structural groups, one is dealing exclusively with structural elements pertaining to commercial practice which, for a long time, have been available at appropriate companies dealing in semiconductor devices. The counter-units, the timing-generators and the A/D-transducers are selected for the desired scanning frequencies (socalled superimposed scanning fixed-cycle sequences), which can amount to a few kHz, however in cases of high-speed systems, can also amount to a few MHz, whereby in the case of the A/D-transducers a resolution is necessary which corresponds to the stages of the brightness-values, for example 128 or 256 grey-value stages or also more. The storage requirement is adjusted to the number of the stored image points and, for example, can amount to a few K-bytes, a few M-bytes or also more, depending on the size of the scanned image and of the utilized raster-fineness, or dissolution.

As storage units, all conventional storage-units can be used, whereby preferably semiconductor-storage-units (CCE- or MOS-storage-units) are possible, but also core memory-units or other data carrying units can be used.

The control in the memorizing unit regarding the take over of the digital data present at the input registers 19 to 35 is prior art and is described in the initially cited U.S. Pat. No. b 3,878,559 or in the British Pat. No. 1,382,124 and, for this reason, is not illustrated here in detail.

The invention is not limited to the precedingly described exemplified embodiment, and further modifications and variants of the invention are possible, without departing from the basic thought and concept of the invention.

We claim the following as our invention:

1. In a process of obtaining digital data for color components of a color image including a plurality of photo-electric transducers for receiving selected light values from the color image, a plurality of color filters corresponding to a first set of colors and disposed between the image and said transducers, respectively, a color processor post-coupled to said transducers and a digital memory, including at least first and second memory segments postcoupled to said color processor, comprising the steps of:

scanning the light values of the color image line-by-line, each of the lines being preceded by a sync pulse, the sync pulse having a predetermined repetition rate, passing the scanned light values through the color filters, respectively, so as to obtain a first set of colored light values corresponding to said first set of colors, converting the set of colored light values to a first set of electrical signals, processing the first set of electrical signals through the color processor for obtaining a second set of electrical signals corresponding to a second set of colors, quantizing the second set of electrical signals into a plurality of digits to obtain first and second raster signal scans, each of said raster signal scans having a multiplicity of raster spots spaced apart from one another in first and second directions at respective first and second predetermined distances, the first and second distances of said first raster signal scan corresponding substantially to said second and first distances of said second raster signal scan, respectively, and storing only the digits of the raster signal scans corresponding to said second set of colors in said first and second memory segments, respectively.

2. A process according to claim 1, further comprising the steps of storing the digits of the raster signal scans at a predetermined clock frequency, selecting the predetermined distances in said first direction so as to be multiples of the inverse of said clock frequency, and selecting the predetermined distances in said second direction so as to be multiples of the inverse of the sync signal repetition rate.

3. A process according to claim 2, further comprising the steps of defining the direction of the raster scan by a helix disposed on a cylindrical surface, and placing the color image on said cylindrical surface.

4. A process according to claim 2, further comprising the steps of selecting said first direction so as to correspond to the direction of the raster scan, and selecting the second direction so as to be substantially at right angles to said first direction.

5. A process according to claim 4, further comprising the steps of placing the color image on a cylindrical surface, and defining the direction of the raster scan by a plurality of circles spaced apart from one another at substantially constant preset distances.

6. A process according to claim 4, further comprising the steps of placing the color image on a plane surface, and defining the direction of the raster scan by a plurality of straight lines spaced apart from one another at substantially constant preset distances.

7. A process according to claim 1, further comprising the steps of selecting said first predetermined distances of said first raster scan so as to exceed the second predetermined distances thereof, respectively, and selecting the first predetermined distances of said second raster scan so as to exceed the second predetermined distances of said second raster scan, respectively, the first and second predetermined distances of said first and second raster scans, on one hand, and the second and first predetermined distances of said second and first raster scans, on the other hand, being substantially equal to one another.

8. A process according to claim 1, further comprising the steps of selecting said second set of colors so as to comprise four colors, two of said second set of colors corresponding to said first raster signal scan, the remaining two of said second set of colors corresponding to said second raster signal scan.

9. A processor for obtaining digital data for color components of a color image, comprising in combination:

a plurality of color filters corresponding to a first set of colors and disposed downstream of the color image for receiving scanned light values from said color image, and for filtering selected colors from the light values so as to obtain a first set of colored light values;

a plurality of photo-electric transducers for receiving said first set of colored light values and for generating a first set of electrical signals therefrom;

a color processor postcoupled to said transducers, for obtaining a second set of electrical signals corresponding to a second set of colors, from said first set of electrical signals;

means postcoupled to said color processor for quantizing each of said second set of electrical signals into a plurality of digits for obtaining first and second raster signal scans, each of said raster signal scans having a multiplicity of raster spots spaced from one another in first and second directions at respective first and second predetermined distances, the first and second predetermined distances of said first raster signal scan corresponding substantially to said second and first predetermined distances of said second raster signal scan, respectively, and a digital memory, including at least first and second memory segments postcoupled to the quantizing means for storing the digits of said first and second raster signal scans in said first and second segments, respectively.

* * * * *